No. 840,210. PATENTED JAN. 1, 1907.
T. HILLMER.
ARRANGEMENT FOR MEASURING QUANTITIES OF LIQUID.
APPLICATION FILED DEC. 10, 1904.

Witnesses

Inventor:

UNITED STATES PATENT OFFICE.

THEO HILLMER, OF BUCHAREST, ROUMANIA.

ARRANGEMENT FOR MEASURING QUANTITIES OF LIQUID.

No. 840,210. Specification of Letters Patent. Patented Jan. 1, 1907.

Application filed December 10, 1904. Serial No. 236,351.

*To all whom it may concern:*

Be it known that I, THEO HILLMER, a subject of the King of Prussia, German Emperor, and a resident of Bucharest, in the Kingdom of Roumania, have invented certain new and useful Arrangements for Measuring Quantities of Liquid, of which the following is a specification.

The invention relates to improvements in devices or arrangements for measuring the quantities of liquids or the like.

Arrangements are known in which the measuring is effected by a manometer united by a column of air or gas with the reservoir containing the liquid to be measured. In these known devices there is the inconvenience that the column of air or gas which is between the manometer and the reservoir is influenced by the pressure of the column of water, because during a greater height of the column of water the air before the manometer-plate is compressed, and vice versa. In these devices it is not possible to keep the same relations during a different time.

Under the present invention the liquid to be measured is caused to act directly on the membrane or spring of the manometer and the said spring or membrane is arranged at such a level as to be above the base of the said reservoir. In this way the zero-point is obtained for measuring at a constant level above the base of the reservoir and is not affected by irregularities in the form of the base.

Figure 1:
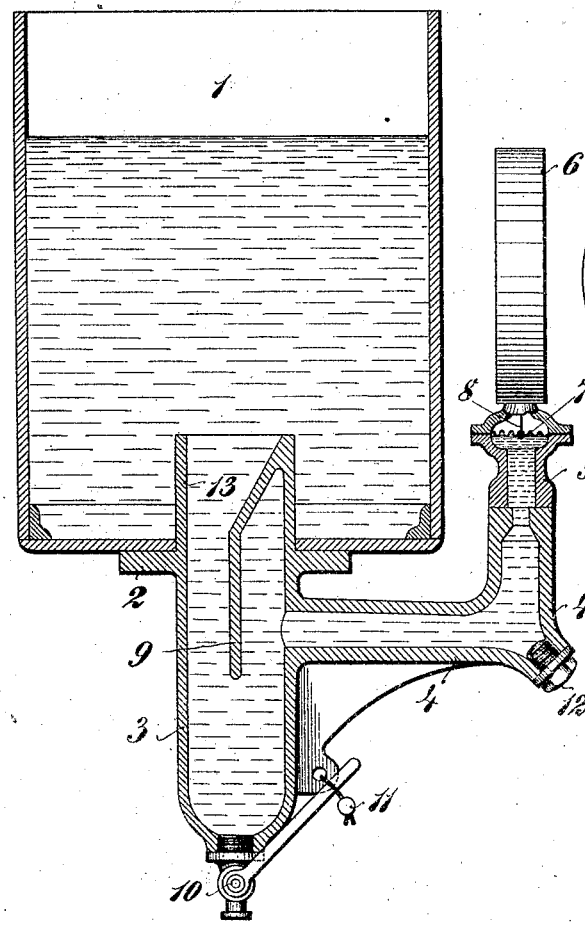
Figure 2:
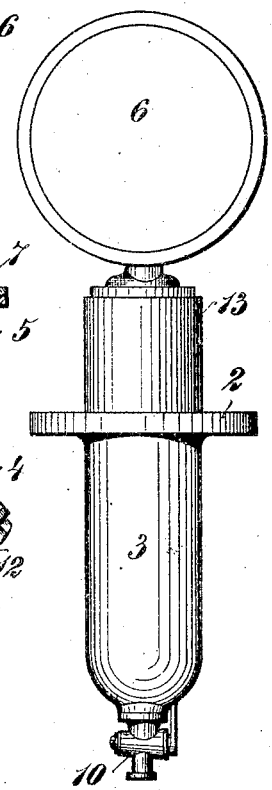
Figure 3:
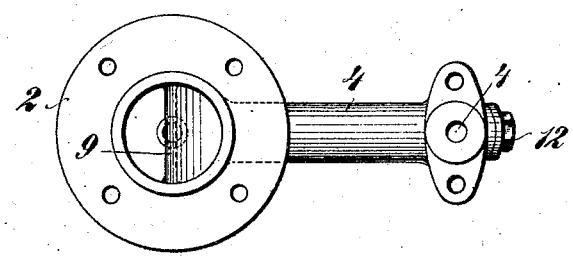

In the accompanying drawings, which illustrate the invention, Figure 1 is a longitudinal elevation, partly in section, showing the device with the vessel for receiving the liquid to be measured. Fig. 2 is a side elevation, and Fig. 3 a plan thereof.

As shown in the said drawings, the reservoir 1 serves to receive the liquid to be measured. On the top of said reservoir is secured, by means of the flange 2, a cylindrical vessel open at the top, which has a branch pipe 4 leading off perpendicular thereto about halfway between the top and the bottom of said vessel 3. Connected to said branch pipe 4 is a union-piece 5, joined to the manometer 6. The manometer 6 may be provided with any suitable mechanism for the present apparatus and may be either vertical or horizontal.

In the form shown a membrane-manometer is provided arranged in a vertical position, in which the liquid-pressure acts directly on the membrane 7 and is transmitted to the rod 8, actuating the indicator-spindle. When the manometer-scale is marked to indicate kilograms or grams, it gives the weight of the column of liquid per unit area—for instance, for one square centimeter of surface of the reservoir 1—so that the weight of the liquid can be read off directly on the manometer. Obviously the scale of the manometer can be arranged for any other system of weights.

The vessel 3 is provided with a sand-trap 9 and with a cock 10, and the latter is provided with a lead seal 11 to provide security against unauthorized opening. Preferably the upper end 13 of the vessel 3 projects above the level of the base of the reservoir 1, so as to prevent the entry of scum and particles of mud into the said vessel 3. It is preferable to have such dimensions for the branch 13 that its upper edge is in alinement with the upper end of the spring of the manometer, so that the zero-point of the manometer-membrane is the zero-point of the branch 13, and on running off the liquid from the cock 10 the liquid-level in the reservoir can never be below zero. It is evident that before the reservoir 1 is filled with liquid the filling of the reservoir is so made that the liquid in the branch 4 directly contacts the membrane 7. The filling can be effected by a screw-pin 12, which can be unscrewed during filling and rescrewed after filling.

It is obvious that the shapes of the vessel 1 and the vessel 3 are immaterial as regards the essence of the invention. The reservoir may be of cylindrical, prismatic, or other shape. The present arrangement may also be employed in stationary basins for measuring liquid therein without departing from the spirit of the present invention.

Having thus described my invention, what I claim as new, and desire to secure by Letters Patent, is—

The combination, a measuring-reservoir, having an outlet-tube, the inner end of said tube being above the bottom of said reservoir a manometer, having a spring-plate, said plate being on a level with the inner end of said outlet-tube and a branch tube, connecting said outlet-tube and said manometer.

In testimony whereof I have hereunto set my hand in the presence of two witnesses.

THEO HILLMER.

Witnesses:
ALRU JANSEN,
WILHELM REUNER.